Sept. 15, 1931.  J. H. WESTFIELD  1,823,633
CONFECTION FREEZER
Filed May 14, 1929   4 Sheets-Sheet 1
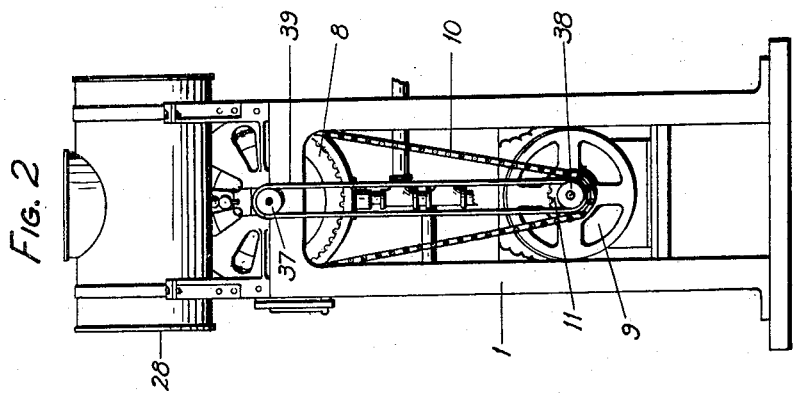
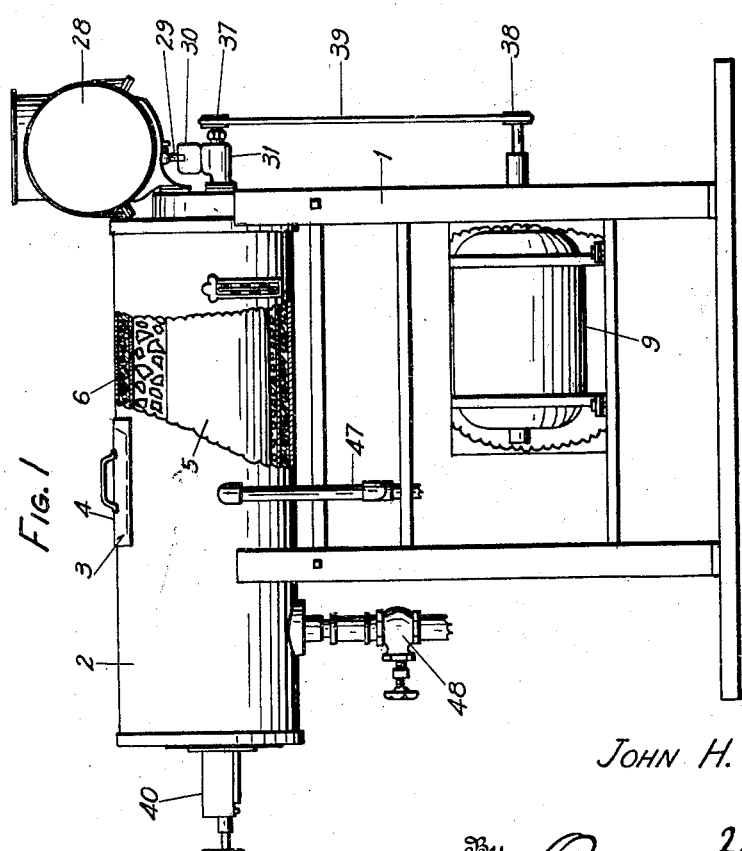
Inventor
JOHN H. WESTFIELD
By Owen H. Spencer
Attorney Sept. 15, 1931.  J. H. WESTFIELD  1,823,633
CONFECTION FREEZER
Filed May 14, 1929    4 Sheets-Sheet 2

Inventor
JOHN H. WESTFIELD
By Owen H. Spencer
Attorney

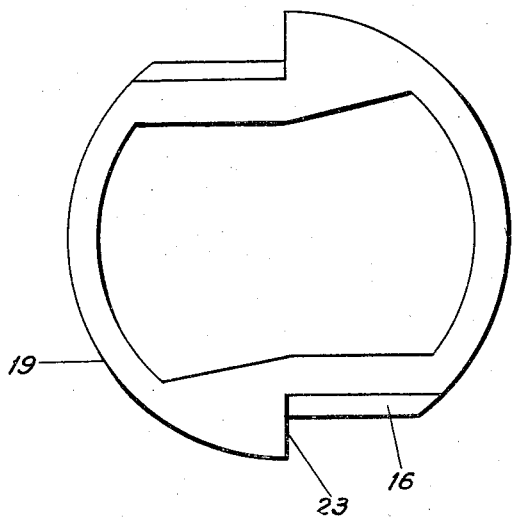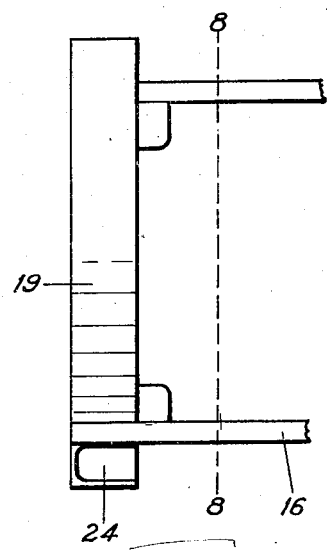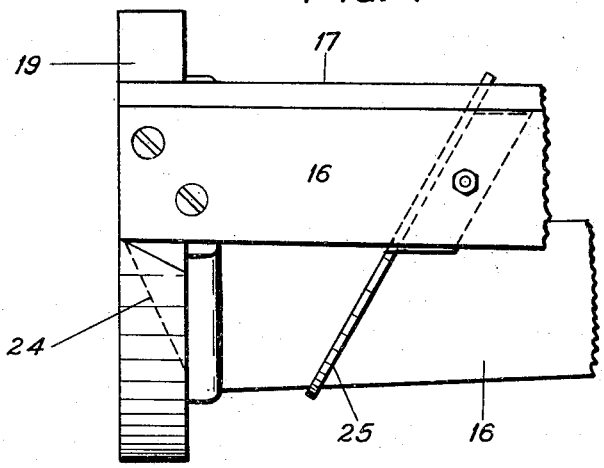

Sept. 15, 1931. J. H. WESTFIELD 1,823,633
CONFECTION FREEZER
Filed May 14, 1929 4 Sheets-Sheet 4

Inventor
JOHN H. WESTFIELD
By Owen H. Spencer
Attorney

Patented Sept. 15, 1931

1,823,633

UNITED STATES PATENT OFFICE

JOHN H. WESTFIELD, OF INDIANAPOLIS, INDIANA

CONFECTION FREEZER

Application filed May 14, 1929. Serial No. 363,046.

This invention relates to freezing mechanisms and of that class adapted primarily for freezing ice cream and its allied products and one feature of the invention is the provision of a structure so arranged that a fluid ingredient entered at one end thereof will be frozen to the proper consistency while passing from one end of the freezer to the other under proper conditions.

A further feature of the invention is the provision of means for positively feeding the fluid ingredient into the freezing chamber of the device.

A further feature of the invention is the provision of a removable transparent chamber for receiving the ingredient from the storage tank containing the ingredient.

A further feature of the invention is the provision of a scraper construction for removing the frozen ingredients from the wall of the freezing chamber and feed the same towards the discharge end thereof.

A further feature of the invention is the provision of means for temporarily stopping the discharge of the frozen product when desired.

Other objects and advantages will be hereinafter more fully set forth and pointed out in the accompanying specification.

In the accompanying drawings which are made a part of this application,

Figure 1 is a side elevation of the freezing device with parts broken out.

Figure 2 is an end elevation thereof.

Figure 5 is an enlarged end elevation of the scraping mechanism.

Figure 6 is a side view thereof.

Figure 7 is a plan view of the same.

Figure 3:
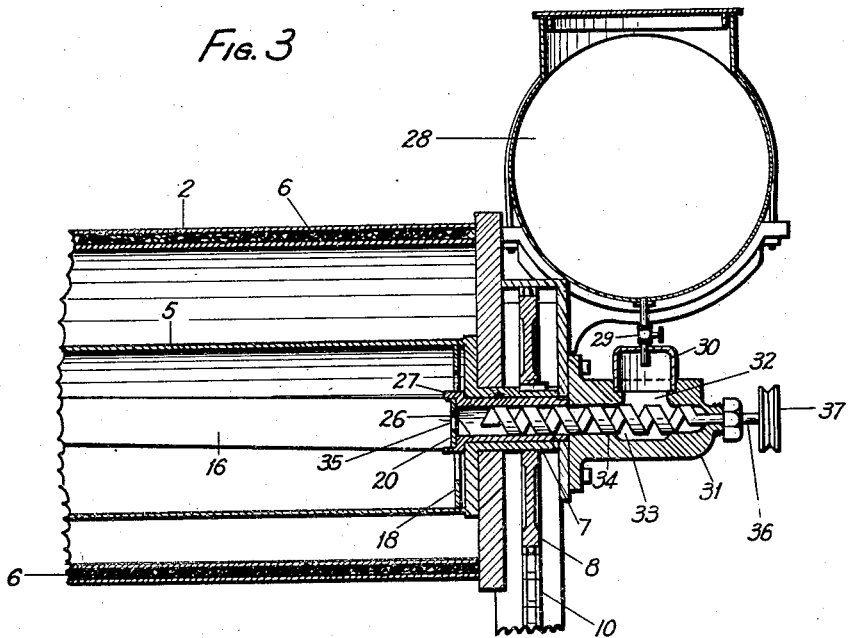
Figure 3 is a vertical longitudinal sectional view of the feed end of the machine.
Figure 4:
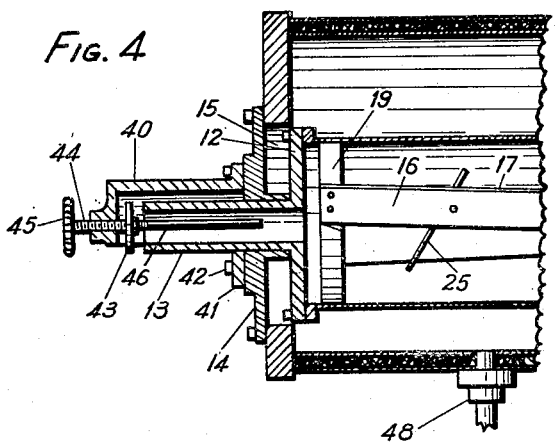
Figure 4 is a similar view of the discharge end of the machine.
Figure 8:
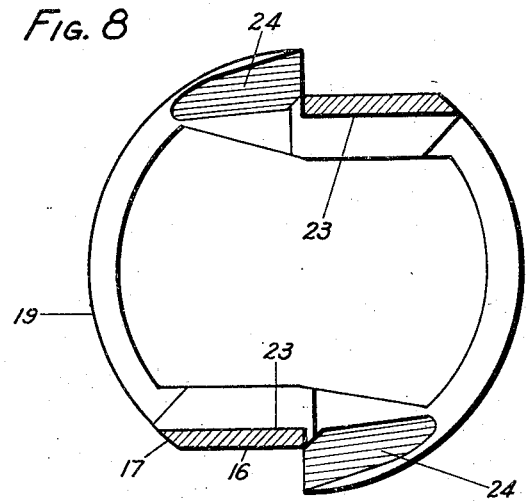
Figure 8 is a transverse section through the scraper mechanism as seen from line 8—8, Fig. 6 and, Figure 9 is a similar view looking toward the opposite end of the scraper.
Figure 9:
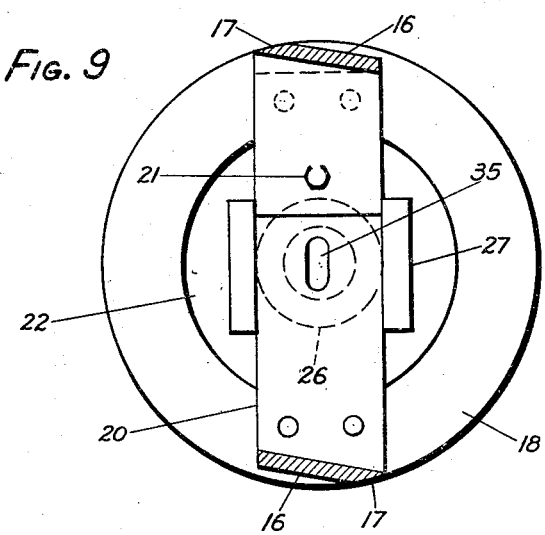

Referring to the drawings in which similar reference numerals designate corresponding parts throughout the several views, the numeral 1 designates a supporting frame structure, which may be constructed in any suitable manner, said frame supporting at its upper end a housing 2 adapted for receiving a freezing medium, preferably ice, said housing having in its upper portion an opening 3, through which the freezing medium may be introduced, a cover 4 being provided for closing said opening.

Mounted within the housing 2, and preferably eccentrically to the axis thereof, is a drum 5, through which the liquid to be frozen is passed, said liquid being entered in one end of said drum and discharged at the opposite end thereof. In order to freeze the liquid to the proper consistency, while passing lengthwise of the drum, the interior of the housing 2 is filled with ice or like freezing material, the walls of the housing preferably having an interposed lining of cork 6 or similar heat resisting material, thereby conserving the cooling medium within the housing.

One end wall of the drum 5 has a tubular shaft 7 attached thereto, which projects through the end wall of the housing 2 and has a driving gear 8 fixed thereto, to which is attached a motor 9, or other driving means, by passing a chain or other form of belt 10 around said gear 8 and a similar gear 11 on the rotor of the motor. The opposite end of the drum 5 has a removable head 12 with which is formed a discharge tube 13, said tube finding a bearing in a disc 14 attached to the end of the housing 2, said disc forming a covering for an opening 15 in the end of the housing. The opening 15 is of sufficient diameter to permit the entrance of the drum into, or removal thereof from the housing and in order to cause the freezing material to feed by gravity towards the discharge end of the drum, the end of the drum containing the discharge tube 13 is slightly lower than the end containing the tubular shaft 7.

Mounted within the drum 5 is a scraper structure comprising a pair of elongated scraper bars 16, one edge of each bar having a cutting edge 17, which are arranged to rest in close proximity to the inner wall face of the drum and serve to slice the freezing ingredient from the wall of the drum as said drum rotates. Fitting the interior of the drum 5 and at the opposite ends thereof, are ring like supporting members 18 and 19, the ring 18 being adjacent the receiving end of the drum, while the ring 19 is adjacent the discharge end thereof. One end of each scraper bar has an angular section 20, one of which is attached to the ring 18 and extends substantially from edge to edge thereof, while the section of the other bar is secured to the other angular member, by means of a bolt 21 or otherwise, said angular sections forming a bar across the opening 22 through the ring 18. The peripheral edge of the ring 19 is provided with right angular notches 23, to one face of each of which are attached the opposite ends of the scraper bars 16, and as the faces to which the ends of the bars 16 are attached, are at a different angle from the angle of the blades at their point of connection with the ring 18, the blades 16 will be given a slight spiral lengthwise contour, which cause said blades to act auger-wise on the material within the drum and aid in moving the same towards the discharge end of the drum. In order to prevent the collection of frozen material at the discharge end of the drum 5, the faces of the notches 23 at right angles to the faces to which the scraper bars 16 are attached are provided with bit forming chambers 24 which cut the frozen material from the head 12 and move the same to a position to be expelled through the discharge tube 13.

In addition to shaping the scraper bars 16 in a manner to feed the contents of the drum 5 towards the discharge tube 13, a disc 25 is positioned between the bars 16, near the discharge end of the drum, said disc being attached to said bars 16 and arranged at such an angle thereto as to force the frozen material through the opening in the ring 19 and through the discharge tube 13.

Extending outwardly through the tubular shaft 7 is a hollow sleeve 26, the outer end thereof being fixed to the frame structure 1, while the inner end has a spanner socket 27 for engagement with the angular sections of the bars 16 at a point within the ring 18, said socket holding the scraper structure against rotation.

The ingredient to be frozen is supplied from a tank 28, mounted adjacent the intake end of the machine, a feed pipe 29 extending from said tank into a receiving chamber 30, which is preferably transparent and removably secured to a coupling 31 attached to parts of the frame 1, said coupling having an opening 32 for the reception of the open end of the receiving chamber, the ingredient being fed into said chamber 30 by gravity. Extending horizontally through the coupling 31 is a bore 33, one end of which registers with the bore in the sleeve 26 and rotatably mounted in said bores is an auger like feed screw 34 for positively feeding the ingredient through the bores and slot 35 through the part 20. The shank 36 of the feed screw projects beyond the wall of the coupling 31 and has a sheave 37 attached thereto, around which, and a similar sheave 38, is extended a belt 39, the sheave 38 being attached to the rotor of the motor.

A hood 40 is extended over the projecting portion of the discharge tube 13, the lower portion of said hood being open for the discharge of the frozen material, the inner end of the hood having a flange 41 for the reception of bolts 42, by means of which the hood is attached to the head 12.

In some rare instances, as when the freezing operation is first started, the liquid will not freeze to the proper consistency, in which event a closure gate 43 is provided, for closing the end of the discharge tube 13 temporarily and retaining the fluid within the drum 5 until it is frozen to the proper consistency, when the gate 43 is again opened. The gate 43 is mounted on adjusting screw 44, threaded through the end wall of the hood 40 and is operated through a hand wheel 45, for opening or closing the same.

In the event the flow of the frozen material through the discharge tube 13 becomes sluggish or clogged, an agitating finger 46 is attached to the gate 43 and extended into the tube 13, which, when agitated, will loosen an accumulation of the frozen material within the tube.

The housing 2 is provided with an overflow pipe 47, which is tapped through the wall of the housing at a point substantially in line with the vertical center of the drum 5. The housing 2 is also provided with a drain pipe 48, so that all the water may be drained from the housing as when cleaning the same.

In operation, a quantity of the liquid to be frozen is entered in the tank 28, and is fed into the receiving chamber 30 through the valve controlled pipe 29 and is then fed into the drum 5 by the feed screw 34, after the motor 9 has been energized. The operation of the motor causes the drum 5 to rotate, and as the liquid is fed into the drum in a comparatively small stream, such liquid will, under normal conditions, be frozen to the proper consistency while passing from one end of drum to the other. If the temperature within the housing is not sufficiently cooled to properly freeze the liquid while passing from end to end of the drum 5, the gate 43 is closed until the proper temperature is reached, when the gate is again opened and the frozen material permitted to discharge.

What I claim is:

1. In a freezing mechanism, a rotatably mounted drum, a tubular shaft at one end of said drum, through which an ingredient to be frozen is conducted to said drum, a scraper structure mounted in said drum, a spanner coupling fixed to the open end of said tubular shaft for holding said scraper structure stationary and having a bore registering with said tubular shaft for the discharge of the ingredient from the tubular shaft, and means rotatable in said bore for positively feeding the ingredient into said drum.

2. In a freezing mechanism, a housing, a drum mounted therein, a tubular shaft connected with said drum, means connected with said shaft for rotating said drum, a scraper structure comprising ring like end members and scraper bars connecting the same, a hollow sleeve extending through said tubular shaft, means for holding said sleeve against rotation, and a spanner socket at the inner end of said sleeve adapted to engage said scraper structure for holding the same against rotation.

3. In a freezing mechanism, the combination with a drum for receiving material to be frozen, and means for rotating the same, of a scraper structure comprising a pair of elongated scraping bars, each having a cutting edge shaped to fit the interior of the drum, a ring like supporting member at each end of said scraping bars, means for attaching the ends of the bars to said ring like supporting members for imparting an auger like contour to said bars between their ends, a bar across the opening in said ring like supporting member formed by the overlapped ends of said scraping bars, and means engaging said bar for holding said scraper structure against rotation.

4. In a freezing mechanism, a rotating drum adapted to receive material to be frozen, a scraper structure within said drum, comprising a pair of scraper bars, ring like members for engagement with said bars, means formed in one of said ring like members for removing frozen material from one end of said drum, and means for holding said scraper structure against rotation.

5. In a freezing mechanism, a rotating drum, a head at one end of said drum, a discharge tube at the axial center of said head and drum through one end of which the contents of said drum discharges, a vertically disposed disk like gate adapted to be moved towards or from the discharge end of said tube for completely or partially closing passage through said tube, an adjusting screw for adjusting said gate, and an agitating finger carried by said gate adapted to enter and loosen the contents of said tube, when desired.

6. In a freezing mechanism, the combination with a rotating drum having a tubular feed inlet axially thereof through which an ingredient to be frozen is introduced into said drum, of a scraper structure comprising a pair of spaced flat scraper bars extending longitudinally of said drum, cutting edges on said bars adapted to conform to the inner wall of said drum, a ring like supporting member at each end of said bars, means for connecting one end of said bars to one of said ring like members and form a bar across the opening therethrough, said bar having a slot registering with the inner end of said tubular inlet for the passage of the ingredient from the inlet and a disc secured between said bars transversely to the longitudinal plane of the bars and edgewise thereto for forcing the frozen materials from said drum.

In testimony whereof, I have hereunto set my hand on this the 11th day of May, 1929.

JOHN H. WESTFIELD.